(No Model.)
E. C. JUDD.
WEIGHING SCALE.
No. 480,020. Patented Aug. 2, 1892.
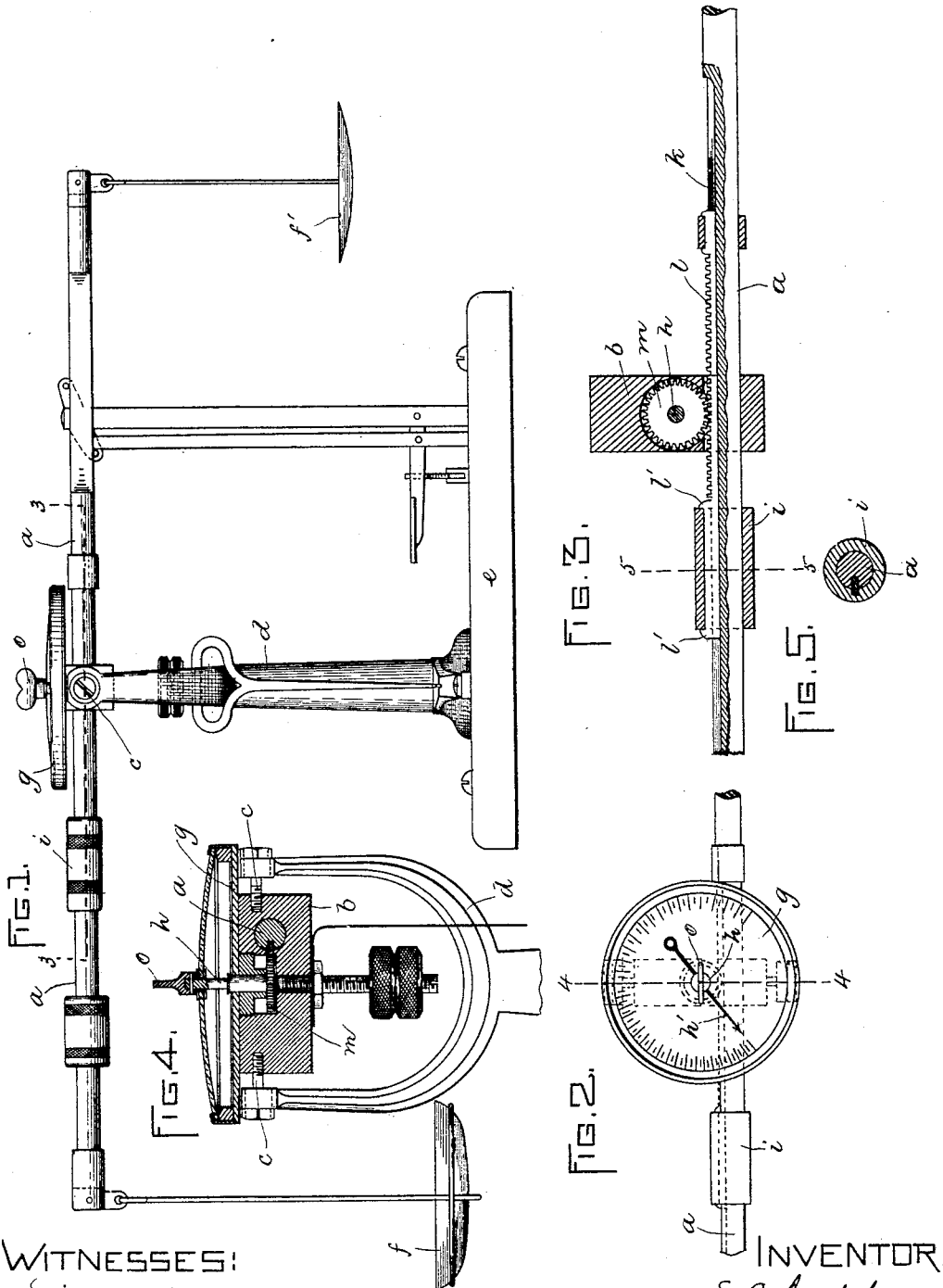
WITNESSES:
Ewing W. Hamlen.
A. D. Harrison.
INVENTOR.
E. C. Judd
by Wright Brown & Crosley
Attys.

UNITED STATES PATENT OFFICE.

EDWARD C. JUDD, OF BOSTON, MASSACHUSETTS, ASSIGNOR TO THE AMERICAN SCALE MANUFACTURING COMPANY, OF SAME PLACE.

WEIGHING-SCALES.

SPECIFICATION forming part of Letters Patent No. 480,020, dated August 2, 1892.

Application filed March 20, 1891. Renewed July 5, 1892. Serial No. 438,926. (No model.)

*To all whom it may concern:*

Be it known that I, EDWARD C. JUDD, of Boston, in the county of Suffolk and State of Massachusetts, have invented certain new and useful Improvements in Weighing-Scales, of which the following is a specification.

This invention relates to weighing-scales in which a scale-beam is pivotally connected to a central support and has pans or receptacles at its ends for the reception of the article to be weighed at one end and the standard of weight at the other.

The invention relates particularly to weighing-scales in which one arm of the beam has a sliding weight, which is movable toward and from the center of the pivot of the beam, as shown in Letters Patent of the United States No. 349,570, dated September 21, 1886, said weight being connected with a shaft journaled in a block attached to the central portion of the beam, said shaft projecting upwardly through a dial attached to said block and being provided above said dial with a hand or pointer, which is caused to assume different positions with relation to the dial by variations in the position of the weight. The connection between the sliding weight and the pointer-carrying shaft is shown in said patent as a flexible chain movable in a groove in the beam and engaged at one end with a weight and at the other end with the shaft.

My invention has for its object to provide a more simple and less expensive connection between the shaft and weight and one which will enable the weight to be moved in either direction by the rotation of the shaft; and to this end the invention consists in the improvements which I will now proceed to describe and claim.

In the accompanying drawings, forming a part of this specification, Figure 1 represents a side elevation of a weighing-scale embodying my invention. Fig. 2 represents a top view of a portion of the same. Fig. 3 represents a section on line 3 3 of Fig. 1. Fig. 4 represents a section on line 4 4 of Fig. 2. Fig. 5 represents a section on line 5 5 of Fig. 3.

The same letters of reference indicate the same parts in all the figures.

In the drawings, $a$ represents the scale-beam, which passes through and is attached at its central portion to a block $b$. Said block is mounted to oscillate on pivots $c$ $c$, affixed to a bifurcated supporting-standard $d$, the latter being mounted on a base $e$. One end of the beam supports a scale-pan $f$ and the other end a weight-support $f'$.

$g$ represents a dial affixed to the upper side of the block $b$, and $h$ represents a shaft journaled in said block and passing through the center of the dial, the shaft being provided above the dial with a hand or pointer $h'$, which is movable by the rotation of the shaft over the graduated surface of the dial.

$i$ represents a weight, which is movable upon one arm of the beam $a$ and is so connected with the shaft $h$ that the position of the hand $h'$ will vary with the position of the weight. The portion of the apparatus above described does not vary materially from that shown in the apparatus shown in the patent above referred to, to which reference can be had for a detailed description, my present improvements relating to the connection between the sliding weight and the shaft $h$.

In carrying out my invention I provide a groove or way $k$ in the beam $a$ and fit in said groove a rack-bar $l$, which is adapted to slide lengthwise of the beam. Said bar is engaged at one end with the weight $i$, so that the bar and weight necessarily move together. The engagement is here shown as effected by means of two shoulders $l'$ $l'$ on the bar, bearing on the ends of the weight; but it may be effected by any other suitable means.

$m$ represents a pinion affixed to the shaft $h$ and meshing with the rack-bar $l$. To the upper end of the shaft $h$ I affix a handle or thumb-piece $o$, whereby the operator is enabled to turn the shaft $h$ and pinion $m$, and thus cause the latter to move the rack-bar and weight upon the beam $a$. It will be seen that the rack-bar $l$ and pinion $m$ constitute a simple and inexpensive means for connecting the weight $i$ and shaft $h$, so that the weight may be moved in either direction by the rotation of the shaft, the handle $o$ enabling the shaft to be conveniently rotated by the operator. This construction is much more simple and economical than the means shown in the patent above referred to for connecting the weight with the pointer-carrying shaft.

I claim—

The combination of the block $b$, pivoted to a supporting-standard, the beam passing through and affixed to said block and provided with a longitudinal slot or guide, a rack-bar adapted to slide in said slot or guide, a weight engaged with one end of said bar, and a hand or pointer carrying shaft journaled in said block and provided with a pinion meshing with said bar and at its upper end with a handle or thumb-piece, whereby the shaft may be rotated to move the weight through the rack-bar, said shaft passing through a dial affixed to the block, as set forth.

In testimony whereof I have signed my name to this specification, in the presence of two subscribing witnesses, this 16th day of March, A. D. 1891.

EDWARD C. JUDD.

Witnesses:
 EWING W. HAMLEN,
 A. D. HARRISON.